United States Patent
Turchi

(10) Patent No.: US 6,970,365 B2
(45) Date of Patent: Nov. 29, 2005

(54) CONTROLLED FREQUENCY POWER FACTOR CORRECTION CIRCUIT AND METHOD

(75) Inventor: Joel Turchi, Toulouse (FR)

(73) Assignee: JPMorgan Chase Bank, N.A., New York, NY (US)

( * ) Notice: Subject to any disclaimer, the term of this patent is extended or adjusted under 35 U.S.C. 154(b) by 228 days.

(21) Appl. No.: 10/432,537

(22) PCT Filed: Dec. 12, 2001

(86) PCT No.: PCT/US01/47725

§ 371 (c)(1), (2), (4) Date: May 22, 2003

(87) PCT Pub. No.: WO03/050935

PCT Pub. Date: Jun. 19, 2003

(65) Prior Publication Data

US 2004/0239296 A1 Dec. 2, 2004

(51) Int. Cl.[7] .............. H02M 5/42; G05F 1/10
(52) U.S. Cl. .............. 363/81; 363/44; 363/89; 323/222; 323/288
(58) Field of Search ................. 323/211, 222, 323/243, 288, 217, 282; 363/17, 89, 90, 47, 48, 126, 81, 44

(56) References Cited

U.S. PATENT DOCUMENTS 5,644,214 A * 7/1997 Lee .............. 323/211

* cited by examiner

Primary Examiner—Rajnikant B. Patel
(74) Attorney, Agent, or Firm—James Stipanuk

(57) ABSTRACT

A power factor correction (PFC) circuit (10) includes a latch (16) having an output that initiates a coil current ($I_{COIL}$) in response to a transition edge of a clock signal (CLOCK) to generate a PFC signal ($V_{OUT}$). An input receives a control signal (TERM). A current modulation circuit (14) has a first input (36) coupled for receiving the PFC signal to establish a charging time ($T_{CH}$) of the coil current. A second input senses the coil current to establish a duty cycle of the coil current over a period of the clock signal, and an output (38) provides the control signal as a function of the charging time and the duty cycle.

19 Claims, 4 Drawing Sheets

CONTROLLED FREQUENCY POWER FACTOR CORRECTION CIRCUIT AND METHOD

BACKGROUND OF THE INVENTION

The present invention relates in general to integrated circuits and, more particularly, to integrated power factor correction circuits.

Integrated power factor correction (PFC) circuits are switching circuits that ensure that an alternating current (AC) line is loaded with an in-phase, substantially sinusoidal current. Without PFC correction, many electrical systems draw current from the AC line voltage only near the peak voltage levels of the AC line. The aggregate effect of loading the AC line with large currents at the voltage peaks and zero current at other times is to produce distortion of the AC line voltage. In addition, systems without PFC can cause high neutral currents to flow in three-phase distribution networks. To avoid these problems so that electrical devices function properly, the distribution networks of regional utility companies must be oversized, which necessitates a large capital investment. Several governments are mandating that PFC be incorporated in the power supplies used in some or all electrical devices.

PFC circuits typically switch current through an inductor or coil from the AC line at a frequency much higher than the frequency of the AC line to magnetize or charge a coil. For example, systems may use a switching frequency of at least one hundred kilohertz when the AC line frequency is fifty hertz. The energy stored in the coil is discharged into a capacitor to generate an intermediate PFC direct current (DC) supply voltage to power an electrical device or system. To attain a substantially sinusoidal AC current, the average value over a switching period of the current switched through the coil is made proportional to the current voltage on the AC line. The result is a high effective power factor for the AC line.

Most previous PFC circuits operate in a free-running mode in which a current is switched to charge the coil as soon as the coil current stored in the previous cycle has been discharged across the capacitor. As a result, the previous PFC circuits switch at a frequency that varies with the current AC line voltage as well as the system's load current. Such variable switching frequencies are difficult to filter out in order to suppress or remove electromagnetic interference generated by the switched coil currents. Such filtering requires complex filters which dissipate power and substantially increase the manufacturing cost of a system.

Hence, there is a need for a PFC circuit and method of correcting the power factor that operates at a fixed or nearly fixed frequency in order to reduce a system's electromagnetic interference while maintaining a low fabrication cost of the PFC circuit.

DETAILED DESCRIPTION OF THE DRAWINGS

In the figures, elements having the same reference number have similar functionality.

Figure 1:
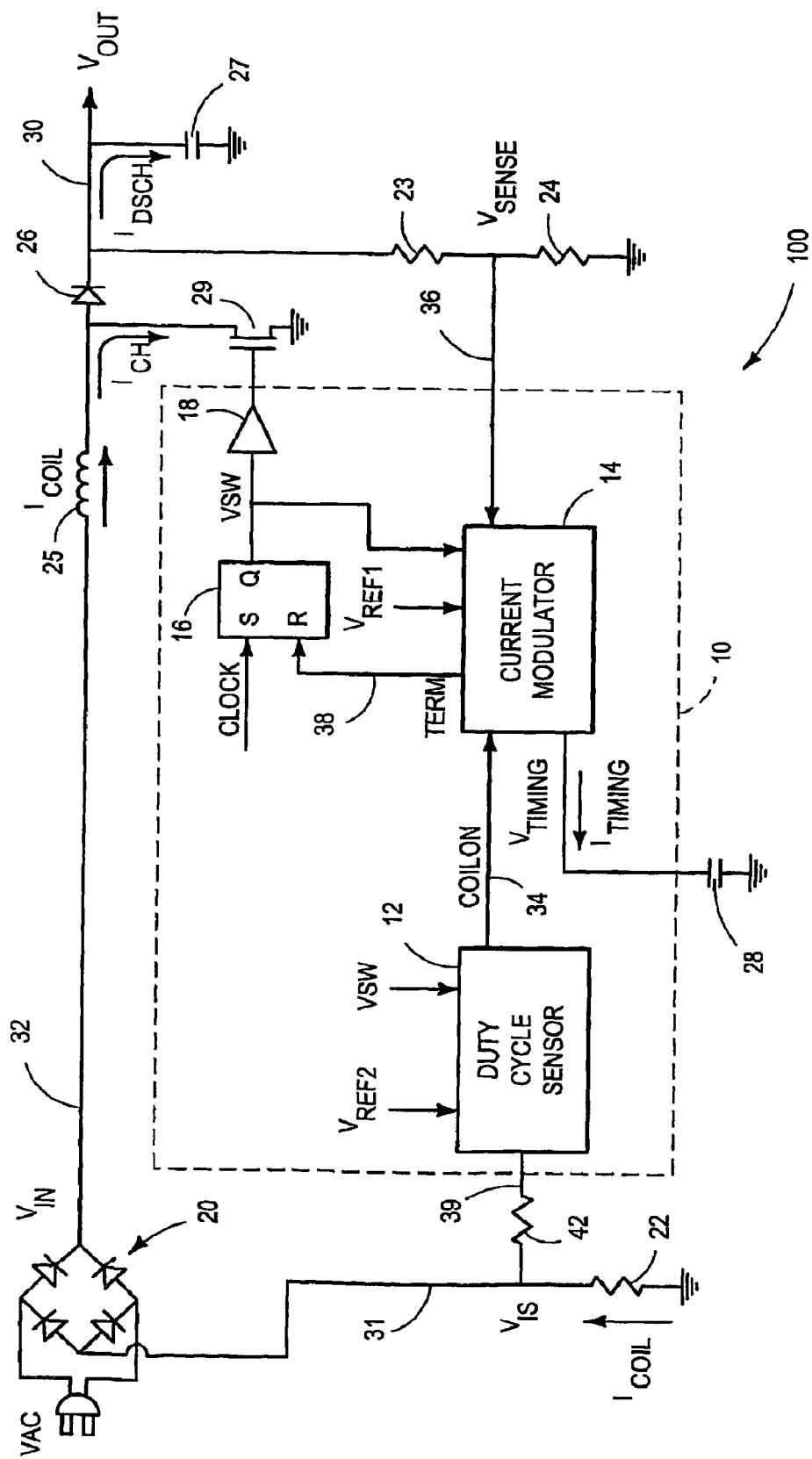
FIG. 1 is a schematic diagram of a power factor correction (PFC) circuit.

FIG. 1 is a schematic diagram of a power factor correction (PFC) circuit 100 controlled by a PFC control circuit 10 and including a diode bridge 20, resistors 22–24, an inductor or coil 25, a diode 26, an output capacitor 27, a timing capacitor 28 and a switching transistor 29. PFC circuit 100 receives a sinusoidal voltage VAC from an alternating current (AC) line and produces a direct current (DC) PFC output signal $V_{OUT}$ at a node or output 30. In one embodiment, PFC circuit 100 functions as a step up switching regulator that receives VAC at a value of about two hundred twenty volts root-mean-square (RMS) and a frequency of about fifty hertz and produces PFC output voltage $V_{OUT}$ with a value of about four hundred volts DC. In some regions, VAC has a value of about one hundred ten volts RMS and $V_{OUT}$ a frequency of sixty hertz. VAC has a typical range of about plus and minus, twenty percent.

Diode bridge 20 is a standard full-wave bridge rectifier that rectifies line voltage VAC and produces a rectified sine wave voltage $V_{IN}$ at a node 32 with a frequency of twice the frequency of VAC or about one hundred hertz and a peak value of about three hundred ten volts. A capacitor (not shown) may be connected across diode bridge 20 to reduce VAC noise peaks.

Coil 25 has a typical inductance L=100.0 microhenries and a low equivalent series resistance for high efficiency operation.

Transistor 29 is a high current n-channel metal-oxide-semiconductor field effect transistor that switches a coil current $I_{COIL}$ through coil 25. In one embodiment, transistor 29 is a power transistor able to switch peak values of coil current $I_{COIL}$ greater than two amperes. These currents are small near the zero crossing point of VAC and large near the VAC voltage peaks. Transistor 29 typically has a large gate capacitance greater than five hundred picofarads.

Coil current $I_{COIL}$ has a component charging current $I_{CH}$ and a component discharging current $I_{DSCH}$. Charging current $I_{CH}$ flows through coil 25 to store magnetic energy in coil 25 when transistor 29 is on. When transistor 29 switches off, the stored magnetic energy flows as discharge current $I_{DSCH}$ from coil 25 through diode 26 to capacitor 27 to develop PFC voltage $V_{OUT}$ on node 30.

Coil current $I_{COIL}$ has a return path through resistor 22 to diode bridge 20 which develops a current sense voltage $V_{IS}$ on a node 31 to monitor when $I_{COIL}$ is flowing. In one embodiment, resistor 22 has a resistance of about 0.2 ohms, so $V_{IS}$ has a value of about –0.2 volts when $I_{COIL}$ has a magnitude of one ampere. Alternatively, the conduction time of $I_{COIL}$ can be measured using a voltage sensing technique, rather than the current sensing arrangement shown in FIG. 1. For example, coil 25 can be formed as a primary winding of a transformer whose secondary winding has a terminal coupled at node 31 to the input of duty cycle sensor 12, typically through a resistor, the other secondary winding terminal being grounded. The secondary winding generates current sense voltage $V_{IS}$ with a positive voltage when $I_{COIL}$ is charging, a negative voltage while $I_{COIL}$ is discharging, and with substantially zero volts when $I_{COIL}$ is zero.

The magnitude of $I_{COIL}$ is a function of PFC output voltage $V_{OUT}$, and is controlled by feeding back $V_{OUT}$ through a voltage divider formed with resistors 23 and 24. This voltage divider samples $V_{OUT}$ and provides a sense voltage $V_{SENSE}$ on a node 36. Resistors 23 and 24 have resistances of $R_{23}$ and $R_{24}$, respectively.

PFC control circuit 10 includes a duty cycle sensor 12, a current modulator 14, a flip-flop or latch 16 and an output buffer 18. Current modulator 14 produces a timing current $I_{TIMING}$ that charges an external capacitor 28 to develop a timing voltage $V_{TIMING}$ that controls the period of charging current $I_{CH}$, and therefore its peak amplitude, as described below. In one embodiment, PFC control circuit 10 is formed on a semiconductor substrate as an integrated circuit.

Output buffer 18 is a standard non-inverting amplifier that is capable of driving the high capacitive load presented by transistor 29.

Latch 16 is a standard R-S flip-flop that has a Q output providing a digital switching signal VSW which is set on a transition edge of a clock signal CLOCK and reset on a transition edge of a digital termination signal TERM. To achieve a high power factor, CLOCK preferably operates at a frequency much greater than the frequency of $V_{IN}$. In one embodiment, $V_{IN}$ has a frequency of about one hundred hertz, or a period of about ten milliseconds, and CLOCK pulses are generated at a controlled or substantially constant frequency of about one hundred kilohertz, or a period of about ten microseconds. When VSW is set, transistor 29 turns on through output buffer 18 to initiate charging component $I_{CH}$ of coil current $I_{COIL}$ to magnetize or store energy in coil 25. When VSW is reset, transistor 29 is turned off through output buffer 18, terminating charging component $I_{CH}$ and initiating discharging component $I_{DSCH}$ of $I_{COIL}$, which flows through diode 26 to transfer energy from coil 25 to capacitor 27.

Duty cycle sensor 12 monitors coil current $I_{COIL}$ and produces a digital coil current sense signal COILON at an output 34 which is logic high when $I_{COIL}$ has a substantially nonzero value and logic low when $I_{COIL}$ is zero. A comparator compares current sense signal $V_{IS}$ with a reference signal $V_{REF2}$ to generate COILON. In one embodiment, duty cycle sensor 12 includes a preamplifier that increases the magnitude of $V_{IS}$ to improve noise immunity. Since VSW is set on each CLOCK pulse to begin a new cycle, the portion of a CLOCK period in which COILON is logic high is indicative of the duty cycle of $I_{COIL}$.

Current modulator 14 has an input at node 36 that monitors PFC signal $V_{OUT}$ through sense signal $V_{SENSE}$ to establish a time $T_{CH}$ for the charging portion $I_{CH}$ of coil current $T_{COIL}$. An input at node 34 senses when $I_{COIL}$ is flowing to provide a digital signal COILON that establishes a duty cycle of $I_{COIL}$ over a CLOCK period. Current modulator 14 includes an error amplifier that amplifies the difference between $V_{SENSE}$ and a reference voltage $V_{REF1}$ to produce a correction signal $V_{ERR}$ for setting the magnitude of $I_{COIL}$, and therefore the time $T_{CH}$. This amplification is integrated with COILON over a period of CLOCK to produce termination signal TERM at an output at node 38 to terminate charging current $I_{CH}$ and initiate discharging current $I_{DSCH}$. Hence, TERM is produced as a function of $T_{CH}$ and the duty cycle. In one embodiment, TERM is produced so as to maintain a constant product of $T_{CH}$ and the duty cycle of $I_{COIL}$ Switching cycles of PFC control circuit 10 are initiated by clock signal CLOCK which preferably operates at a constant or nearly constant frequency. Since the period of CLOCK is much smaller than the period of $V_{IN}$, a substantially constant voltage $V_{IN}$ appears across coil 25 when transistor 29 turns on. Coil current $I_{COIL}$ increases linearly with a slope approximately equal to $V_{IN}/L$, so its peak value is $I_{PEAK} = T_{CH}{}^*V_{IN}/L$, where $T_{CH}$ is the duration of charging current $I_{CH}$. Similarly, the slope of discharging current $I_{DSCH}$ is approximately equal to $(V_{OUT}-V_{IN})/L$, and its duration $T_{DSCH}=L^*I_{PEAK}/(V_{OUT}-V_{IN})$. Hence, the total period when $I_{COIL}$ is nonzero is given by equation 1), $$T_{COIL} = T_{CH} + T_{DSCH} = L \cdot I_{PEAK} \cdot \frac{V_{OUT}}{V_{IN} \cdot (V_{OUT} - V_{IN})}. \quad 1)$$

It can be shown that the average coil current $T_{COIL\_CLOCK}$ over a CLOCK period $T_{CLOCK}$ is given by equation 2), $$I_{COIL\_CLOCK} = \frac{V_{IN} \cdot T_{CH}}{2 \cdot L} \cdot \frac{(T_{CH} + T_{DSCH})}{T_{CLOCK}} = \frac{V_{IN}}{2 \cdot L}(T_{CH} \cdot D_{CYCLE}) \quad 2)$$

where $D_{CYCLE}=(T_{CH}+T_{DSCH})/T_{CLOCK}$. A high power factor is achieved when the average coil current $I_{COIL\_CLOCK}$ follows the rectified sinusoidal shape of $V_{IN}$, which occurs if $T_{CH}{}^*D_{CYCLE}$ is made constant.

Figure 2:
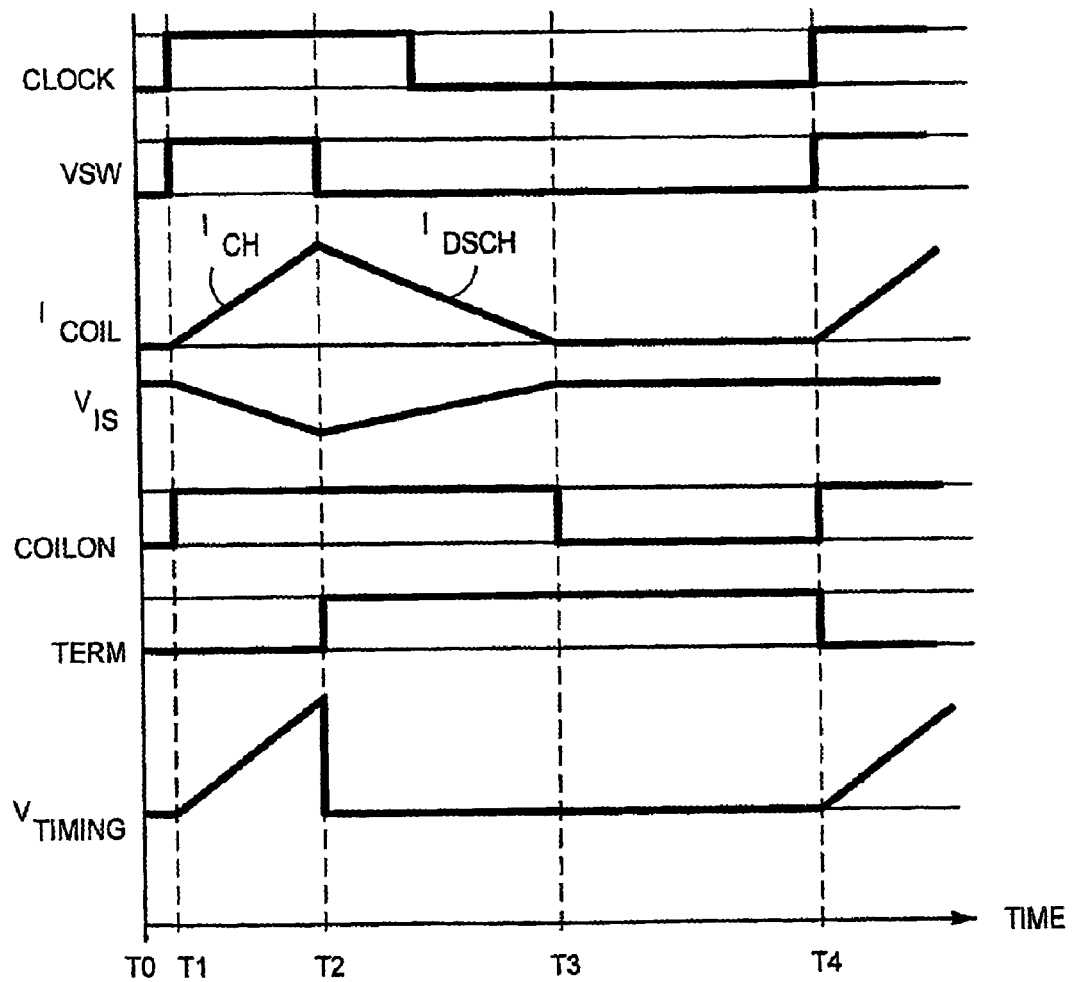
FIG. 2 is a timing diagram showing waveforms of the PFC circuit.

The operation of PFC control circuit 10 can be seen by referring to FIG. 2, which is a timing diagram showing selected waveforms of PFC control circuit 10. Initially, at time T0, assume that clock signal CLOCK, switching signal VSW, termination signal TERM and coil current sense signal COILON are all low. Further assume that coil current $I_{COIL}$, current sense voltage $V_{IS}$, timing current $I_{TIMING}$ and timing voltage $V_{TIMING}$ each are equal to zero.

At time T1, a low to high transition edge of CLOCK sets latch 16 to induce a low to high transition of VSW, turning on transistor 29 through buffer 18 to initiate coil current $I_{COIL}$. Note that the component of $I_{COIL}$ that begins to flow at time T1 is charging current $I_{CH}$. Since the period of CLOCK is much less than the period of $V_{IN}$, and the voltage drop across transistor 29 typically is small, a substantially constant voltage $V_{IN}$ is applied across coil 25 to cause $I_{COIL}$ to increase linearly or ramp up at a rate $V_{IN}/L$ as shown. $I_{COIL}$ flows through resistor 22 to develop current sense voltage $V_{IS}$, which also ramps linearly but in a negative voltage direction as shown. The low to high VSW transition sets COILON high to enable timing current $I_{TIMING}$, which charges capacitor 28 to develop timing voltage $V_{TIMING}$ as a linear ramp.

At time T2, $V_{TIMING}$ reaches a threshold voltage to generate a low to high transition of termination signal TERM, which resets latch 16. This threshold voltage may be a predetermined voltage or a variable voltage, as described in detail below. A high to low transition of VSW terminates charging current $I_{CH}$ and initiates discharging current $I_{DSCH}$ of $T_{COIL}$ to transfer energy from coil 25 to capacitor 27. VSW also closes a switch that discharges capacitor 28 and shunts $I_{TIMING}$ to ground to reduce $V_{TIMING}$ to zero as shown. $I_{DSCH}$ decreases in a linear fashion with a slope $(V_{OUT}-V_{IN})/L$ until the magnetic energy stored in coil 25 is fully discharged.

At time T3, $I_{COIL}$ decreases to zero. Current sense signal $V_{IS}$ also ramps to zero, which produces a high to low transition of coil current sense signal COILON. $I_{COIL}$ remains substantially zero for the remainder of the CLOCK period until time T4, when the next cycle begins.

Figure 3:
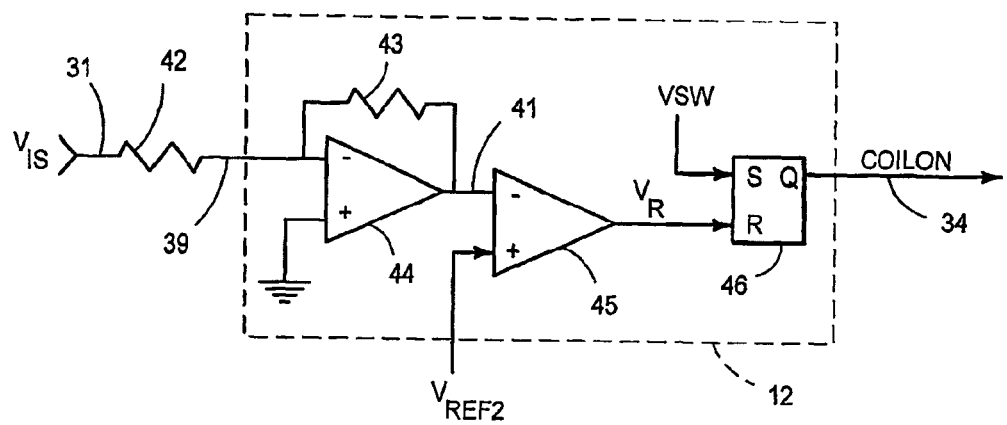
FIG. 3 is a schematic diagram of a duty cycle sensor of the PFC circuit.

FIG. 3 shows a schematic diagram of duty cycle sensor 12 coupled to resistor 42, including an amplifier 44, a comparator 45, a latch 46 and resistors 42–43. Duty cycle sensor 12 receives sense signal $V_{IS}$ at node 31 through resistor 42 to monitor the flow of coil current $I_{COIL}$. An output is coupled to node 34 to produce coil current sense signal COILON with a logic low value when $I_{COIL}$ is substantially zero and a logic high value when $I_{COIL}$ is nonzero.

At time T1, a logic low to high transition of clock signal CLOCK sets switching signal VSW to a logic high value to initiate coil current $I_{COIL}$. Latch 46 is set to produce a low to high logic transition of COILON on node 34 to indicate that $I_{COIL}$ is flowing, i.e., has a nonzero value. Concurrently, sense signal $V_{IS}$ ramps from zero to a negative value.

Amplifier 44 and resistors 42–43 function as a gain stage that amplifies $V_{IS}$ to increase the system noise immunity. In one embodiment, resistor 43 has a value of about ten kilohms and resistor 42 has a value of about one kilohm, which results in an amplified signal on a node 41 whose value is about $(-10*V_{IS})$. Hence, node 41 ramps from zero to a positive level until time T2, when its value begins to decrease toward zero volts as coil 25 discharges. When the potential on node 41 decreases to a value less than $V_{REF2}$, comparator 45 generates a logic low to high transition of a reset signal $V_R$, which resets latch 46 to produce a high to low logic transition of COILON that indicates that $I_{COIL}$ has discharged to substantially zero. In practice, $V_{REF2}$ may be set to a small positive nonzero value to avoid an oscillatory condition in comparator 45 that effectively introduces noise in $V_R$. In one embodiment, $V_{REF2}$ is set to 0.1 volts, which corresponds to a value of $I_{COIL}=0.05$ amperes.

Figure 4:
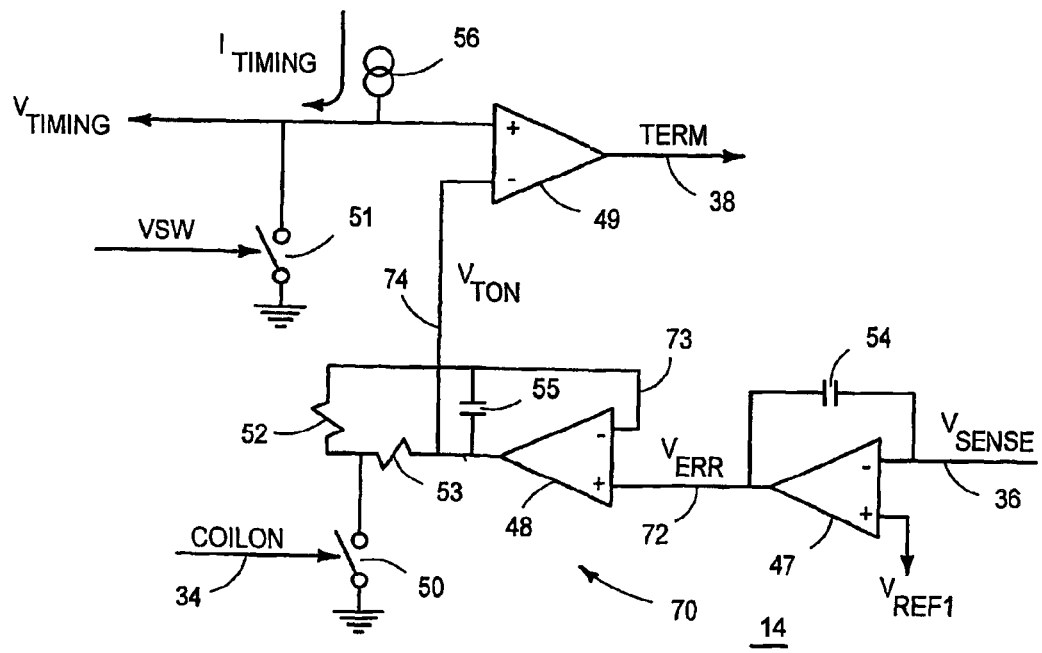
FIG. 4 is a schematic diagram of a current modulator of the PFC circuit.

FIG. 4 is a schematic diagram showing current modulator 14 in further detail, including amplifiers 47–48, a comparator 49, switches 50–51, resistors 52–53, capacitors 54–55 and a current source 56. Resistors 52 and 53 have resistances $R_{52}$ and $R_{53}$, respectively, while capacitors 54 and 55 have capacitances $C_{54}$ and $C_{55}$, respectively.

Amplifier 47 functions as an error amplifier that compares sense signal $V_{SENSE}$ to reference voltage $V_{REF1}$ and amplifies their difference to produce correction signal $V_{ERR}$ on node 72. In effect, amplifier 47 amplifies the difference between the desired value of $V_{OUT}=V_{REF1}*(1+R_{23}/R_{24})$ and the actual current value of $V_{OUT}$. PFC control circuit 10 effectively regulates VOUT by maintaining VSENSE substantially equal to VREF. Capacitor 54 and resistors 23–24 function as an integrator or low pass filter which filters out either one hundred hertz or one hundred twenty hertz ripple in $V_{SENSE}$ which may be present in PFC signal $V_{OUT}$, depending on the local or regional frequency of VAC. Capacitor 54 and resistors 23–24 produce an integration time constant $R_{23}*R_{24}*C_{54}/(R_{23}+R_{24})$ that attenuates $V_{SENSE}$ fluctuations having a shorter duration. In one embodiment, the time constant is at least five times the period of $V_{IN}$ so, for example, when $V_{IN}$ has a period of ten milliseconds, the time constant is set to be at least fifty milliseconds. Hence, $V_{ERR}$ is considered to be substantially constant over a period of $V_{IN}$.

Correction signal $V_{ERR}$ is effectively divided by the duty cycle of $I_{COIL}$ in a gain stage 70 that includes amplifier 48, resistors 52–53, capacitor 55 and switch 50. Gain stage 70 functions as an integrator whose time constant is set by resistors 52–53 and capacitor 55 to filter out switching transients present when switch 50 is opened and closed at the frequency of clock signal CLOCK. This time constant preferably has a value in the range of five times the period of CLOCK or greater. For example, if a period of CLOCK is ten microseconds, the time constant of resistors 52–53 and capacitor 55 preferably is at least fifty microseconds. A control or threshold signal $V_{TON}$ is provided at a node 74.

The operation of gain stage 70 is as follows. When COILON is high, such as from time T1 to time T3 ($I_{COIL}$ is nonzero), switch 50 is open. $V_{err}$ functions as a reference voltage coupled to the non-inverting input of amplifier 48. $V_{TON}$ is coupled to the inverting input through resistors 52 and 53 and the difference ($V_{ERR}-V_{TON}$) is integrated with a time constant $T_{SW0}=C_{55}*(R_{52}+R_{53})$. When COILON is low, such as from time T3 to T4 ($I_{COIL}$ is zero), switch 50 is closed and the voltage across switch 50 is approximately zero. Substantially zero volts is then applied to the inverting input of amplifier 48 through resistor 52. $V_{ERR}$ still acts as a reference voltage at the noninverting input of amplifier 48, and the difference ($V_{ERR}-0.0$ volts) is integrated with an integration time constant $T_{SW1}=C_{55}*R_{52}$. Resistor 53 is selected to be much smaller than resistor 52, so $T_{SW0}=T_{SW1}$, approximately, to produce substantially equal integration time constants regardless of the position of switch 50. Time constants $T_{SW0}$ and $T_{SW1}$ are preferably selected to be higher than the period of CLOCK, so a time-weighted average voltage $V_{TON}*(T3-T1)/(T4-T1)=V_{TON}*D_{CYCLE}$ is present at the inverting input of amplifier 48, where $D_{CYCLE}=(T3-T1)/(T4-T1)$ is the duty cycle of $I_{COIL}$ over a CLOCK period. The regulation of $V_{OUT}$ by PFC circuit 100 ensures that $V_{ERR}=V_{TON}*D_{CYCLE}$ or $V_{TON}=V_{ERR}/D_{CYCLE}$ at the respective inputs of amplifier 48. Since $V_{ERR}$ is substantially constant over a period of CLOCK, so is the product $V_{TON}*D_{CYCLE}$, which results in $I_{COIL}$ having a sinusoidal shape and PFC circuit 100 having a high power factor.

$V_{TIMING}$ is generated by charging a capacitance $C_{28}$ with a constant current $I_{TIMING}$, and therefore has a ramp shape that is a linear function of $I_{TIMING}$. $V_{TON}$ is coupled to an input of comparator 49 to control the trip point at which timing voltage $V_{TIMING}$ sets termination signal TERM to logic high to terminate charging current $I_{CH}$.

Note that $I_{TIMING}$ is held substantially constant while correction voltage $V_{ERR}$ is adjusted by COILON to generate threshold voltage $V_{TON}$ so that the product $T_{CH}*D_{CYCLE}$ is substantially constant. As indicated above, when $T_{CH}*D_{CYCLE}$ is constant, the average value of $I_{COIL}$ is sinusoidal and in phase with AC line voltage VAC, which results in a high power factor. The high power factor is achieved while switching coil current $I_{COIL}$ at a constant frequency with clock signal CLOCK to reduce the level of electromagnetic interference or to facilitate its attenuation by filtering.

Figure 5:
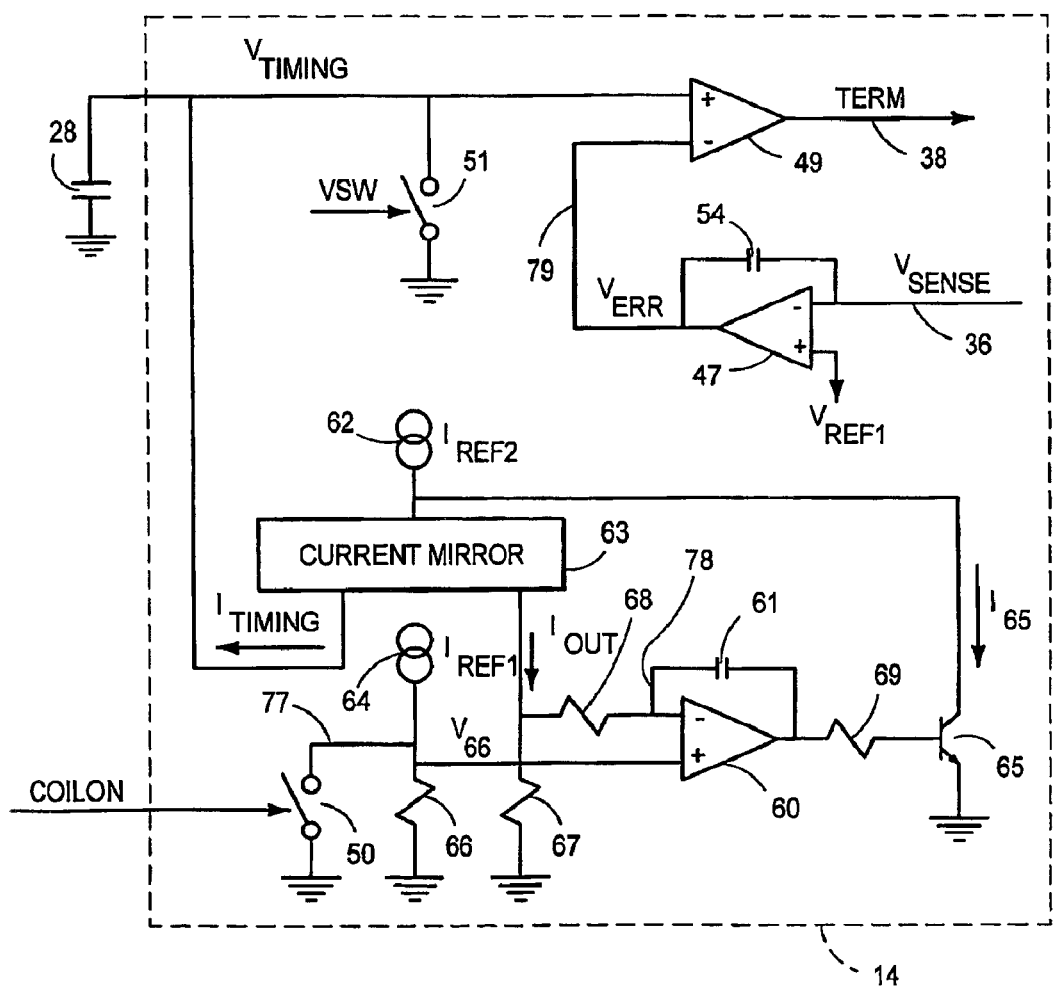
FIG. 5 is a schematic diagram of the current modulator in an alternate embodiment.

FIG. 5 is a schematic diagram showing current modulator 14 in an alternate embodiment. In this embodiment, correction voltage $V_{ERR}$ is coupled directly to the inverting input of comparator 49 to control the switching threshold of $V_{TIMING}$, while $I_{TIMING}$ is adjusted by duty cycle DC of $I_{COIL}$ to maintain the product $T_{CH}*D_{CYCLE}$ constant.

Amplifier 60 operates as an integrator with integration time constant $T_{SW}=C_{61}*R_{68}$, where $C_{61}$ is the capacitance of capacitor 61 and $R_{68}$ is the resistance of resistor 68. Capacitor 61 and resistor 68 preferably are selected so that $T_{SW}$ is much greater than the period of CLOCK.

From T1 to T3, when $I_{COIL}$ is nonzero, COILON is high, switch 50 is open and reference current $I_{REF1}$ is routed through a resistor 66 to develop a voltage $V_{66}=I_{REF1}*R_{66}$ on a node 77, where $R_{66}$ is the resistance of resistor 66. From T3 to T4, when $I_{COIL}$ is zero, COILON is low, switch 50 is closed, and voltage $V_{66}=0.0$ volts on node 77. When integrated over a period of CLOCK, the time weighted average value of voltage $V_{66}$ is $I_{REF1}*R_{66}*D_{CYCLE}=V_{66}*D_{CYCLE}$.

The output of amplifier 60 controls the base current of a transistor 65 in conjunction with a resistor 69. This arrangement produces a collector current $I_{65}$ which is subtracted from a reference current $I_{REF2}$ to produce a current $I_{OUT}$ that develops a voltage $V_{67}$ across resistor 67. Collector current $I_{65}$ provides a feedback path that maintains $V_{66}$ and $V_{67}$ at the same effective average potential, so $I_{OUT}=I_{REF1}*D_{CYCLE}*R_{66}/R_{67}$. Timing current $I_{TIMING}$ is mirrored to $I_{OUT}$ and scaled to a factor K by a current mirror 63, so that $I_{TIMING}=K*I_{OUT}=K*I_{REF1}*D_{CYCLE}*R_{66}/R_{67}$. Hence, $I_{TIMING}$ is proportional to duty cycle $D_{CYCLE}$.

$I_{TIMING}$ charges capacitor 28 as described above to produce timing voltage $V_{TIMING}$ as a ramp which is compared to $V_{ERR}$ in comparator 49 to produce control signal TEMP. Since $I_{TIMING}$ is substantially constant over a period of $V_{IN}$ and $V_{TIMING}=I_{TIMING}*T_{CH}=K*I_{REF1}*D_{CYCLE}*T_{CH}*R_{66}/R_{67}$, the product $T_{CH}*D_{CYCLE}$ is substantially constant. Therefore, $I_{COIL}$ has an average current that is sinusoidal and PFC circuit 100 has a high power factor.

In summary, the present invention provides a PFC circuit that is capable of operating at a constant or nearly constant frequency, thereby facilitating the reduction of electromagnetic interference through filtering. A latch has an output that initiates a coil current in response to a transition edge of a clock signal to generate a PFC signal. A current modulation circuit senses the PFC signal to establish a charging time of the coil current, and senses the coil current to establish a duty cycle of the coil current over a period of the clock signal. An output of the current modulation circuit is applied to an input of the latch to provide a control signal that is a function of the charging time and the duty cycle.

What is claimed is:

1. A power factor correction circuit, comprising:
   a first latch having an output for initiating a coil current in response to a transition edge of a clock signal to generate a PFC signal, and an input for receiving a control signal;
   a current modulation circuit having a first input coupled for receiving the PFC signal to establish a charging time of the coil current, a second input coupled for sensing the coil current to establish a duty cycle of the coil current over a period of the clock signal, and an output for providing the control signal as a function of the charging time and the duty cycle; and
   a current sensor having an input coupled for sensing the coil current and an output for providing a sense signal, the current sensor including a first amplifier having a first input coupled to the input of the current sensor and a second input for establishing a threshold level of the coil current, and the current sensor also including a second latch having a first input coupled to the output of the first latch, a second input coupled to an output of the first amplifier and an output coupled to the second input of the current modulation circuit for generating the sense signal as a first logic state on the transition edge of the clock signal and as a second logic state when the coil current falls below the threshold level.

2. The PFC circuit of claim 1, wherein the current modulation circuit includes:
   a second amplifier having a first input for receiving the PFC signal and a second input for receiving a reference signal; and
   a third amplifier having a first input coupled to an output of the second amplifier and an output for providing the control signal.

3. The PFC circuit of claim 2, wherein the current modulation circuit further includes a first switch operating in response to a sense signal applied at the second input of the current modulation circuit switching a second input of the third amplifier from the output of the third amplifier to a reference node to establish the duty cycle.

4. The PPC circuit of claim 3, wherein the current modulation circuit further comprises a reactive component coupled for averaging a potential at the output of the second amplifier to produce the control signal.

5. The PFC circuit of claim 4, wherein the reactive component is a capacitor that sets a time constant of the current modulation circuit to a value greater than the period of the clock signal.

6. The PFC circuit of claim 3, wherein the current, modulation circuit further includes:
   a comparator having a first input coupled to an output of the second amplifier and an output for providing the control signal;
   a current source coupled to a second input of the comparator for charging a capacitance; and
   a second switch coupled to the current source and responsive to the output of the first latch for discharging the capacitance to terminate the charging portion of the coil current.

7. The PFC circuit of claim 1, wherein the current modulation circuit includes:
   a comparator having a first input coupled for receiving a ramp signal and an output for providing the control signal;
   a second amplifier having a first input for receiving the PFC signal, a second input for receiving a reference signal, and an output coupled to a second input of the comparator; and
   an averaging circuit having an input coupled to the output of the second latch for averaging a first reference current over the period of the clock signal to produce an averaging current indicative of the ditty cycle.

8. The PPC circuit of claim 7, wherein the averaging circuit includes:
   a switch for switching the first reference signal with the sense signal to produce a duty cycle signal; and
   an integrator having a first input coupled for receiving the second reference signal, a second input for receiving the duty cycle signal, and an output for providing the averaging current.

9. The PFC Circuit of claim 8, wherein the averaging current is for charging a capacitance to produce the ramp signal.

10. A method of correcting a power factor, comprising the steps of:
    initiating a coil current at the beginning of a clock period to generate a power factor corrected signal;
    sensing both a charging portion of the coil current and a discharging portion of the coil current to determine a duty cycle of the coil current over the clock period; and
    terminating a charging portion of the coil current with a control signal that is a function of the PFC signal and the duty cycle.

11. The method of claim 10, wherein the step of terminating includes the steps of:
    amplifying a difference between the PFC signal and a first reference signal to produce a correction signal; and
    dividing the correction signal by the duty cycle to produce the control signal.

12. The method of claim 11, wherein the step of dividing includes the steps of:
    routing the correction signal to a first input of an amplifier;
    switching a second input of the amplifier to an output of the amplifier while the coil current flows; and
    switching the second input of the amplifier to a reference node when the coil current terminates.

13. The PFC circuit of claim 12, wherein the step of dividing further includes the step of filtering the control signal with a time constant greater than the clock period.

14. The method circuit of claim 10, wherein the step of terminating includes the steps of:
 charging a capacitance with a reference current at the beginning of the clock period to generate a ramp signal; and
 comparing the control signal with the ramp signal to produce a termination signal that initiates a discharging portion of the coil current.

15. The method of claim 10, further comprising the steps of:
 dividing a reference current by the duty cycle to produce a ramp current;
 charging a capacitance with the ramp current to produce a ramp voltage; and
 comparing the ramp voltage with a reference signal to produce the termination signal.

16. An integrated power factor correction circuit, comprising:
 a driver circuit having a first input for receiving clock pulses to initiate a coil current, a second input for receiving a control signal to terminate a charging portion of the coil current, and an output for generating a PFC signal with the coil current; and
 a modulation circuit having a first input coupled for sensing the PFC signal to set an amplitude of the coil current, a second input for monitoring the coil current over a period of the clock pulses to produce a duty cycle signal, and an output for providing the control signal as a function of the amplitude and the duty cycle signal.

17. The integrated PFC circuit of claim 16, wherein the modulation circuit includes:
 an averaging circuit having a first input coupled for sensing the PFC signal, and an output for producing the control signal; and
 a switch operating in response to the duty cycle signal for switching a second input of the averaging circuit between the output of the averaging circuit and a reference signal.

18. The integrated PFC signal of claim 17, wherein the modulation circuit includes an error amplifier having a first input coupled for receiving the PFC signal, a second input coupled for receiving a reference signal, and an output coupled to the first input of the averaging circuit.

19. The method of claim 10, wherein sensing both the charging portion of the coil current and the discharging portion of the coil currenL to deternu.ne the duty cycle of the coil current over the clock period includes determining the duty cycle of the coil current as a portion of the clock period during which both the charging portion of the coil current and the discharging portion of the coil current are substantially nonzero.

* * * * *